Patented Mar. 2, 1937

2,072,280

UNITED STATES PATENT OFFICE 2,072,280

SHEET MATERIAL AND METHOD OF MAKING SAME

George Schneider, Montclair, and Bjorn Andersen, Maplewood, N. J., assignors to Celanese Corporation of America, a corporation of Delaware No Drawing. Application November 16, 1934, Serial No. 753,302

5 Claims. (Cl. 18—48)

This invention relates to non-brittle products containing derivatives of cellulose and especially to such products in the form of sheet material and to the method of making same, which method prevents brittleness.

An object of the invention is the economic and expeditious production of artificial products moulded or formed from organic derivatives of cellulose. Another object of the invention is the method of forming the articles so that during the heat conversion operation the unequal conversion of various parts of the article is avoided, thereby preventing brittle spots. Other objects of the invention will appear from the following detailed description.

This invention, although applicable to the processing of organic esters of cellulose in general, is particularly applicable to the processing of cellulose acetate. The brittleness of sheets or articles formed of organic esters of cellulose is caused by a number of factors: the acyl value and viscosity of the ester of cellulose, plasticizer, solvent, formulation and processing, each effecting the brittleness of the product in varying degree. While all these factors, are separate factors they are somewhat dependent upon each other and the general cause of brittleness resulting from these factors amounts to insufficient conversion. Conversion is the transformation of the organic ester from a raw product to a finished product and the change is generally caused by the action of the solvents and plasticizer under the influence of heat and pressure. This invention in particular relates to the particular method of applying the heat and pressure conversion but necessarily includes one or more of the other factors upon which it is dependent.

Sheets and articles formed of organic esters of cellulose by this invention are non-brittle and uniform in toughness throughout. In sheets, where greatest difficulty formerly existed, there were overly converted edges which were hard or crumbly or under converted centers which were brittle and harsh. The sheets formed according to this invention are uniform and tough from edges to center and they may be formed clear and transparent with no development of cloudy or smeared effects. There are no lines of strain by the joint between tough and brittle portions as found in sheets processed by some other methods.

According to our invention we convert articles of organic esters of cellulose from the raw state to a finished state, or a state preparatory to cutting, moulding or otherwise shaping, by applying heat and pressure to the raw or semi-processed article in such a manner that a wave of heat is pulsated or driven into the center of the article to raise same immediately to a converting temperature and then maintaining the entire article at a converting temperature until conversion is complete. The amount and differential of temperatures will depend upon factors hereafter set forth.

This invention is applicable to the processing of organic esters of cellulose, for example, cellulose acetate, cellulose formate, cellulose propionate and cellulose butyrate. The invention is also applicable to the processing of cellulose nitrate and the ethers of cellulose such as methyl cellulose, ethyl cellulose and benzyl cellulose.

A suitable ester of cellulose is selected having the desired viscosity, acyl value and brittleness for the particular purpose to which the product is to be put. If a particular lot shows a tendency to convert poorly and signs of excess brittleness, it should be designated for use in soft stock with high plasticizer content or given extra kneading, additional solvent, or it should be used for moulding highly filled articles. Only the best lots should be used for sheet stock designated for the manufacture of laminated glass or for purposes where brittleness is absolutely objectionable. For this purpose and in order to cut down hydrolysis during block pressing the anhydrous ester of cellulose may be formed.

The selected ester of cellulose may then be dissolved in a volatile solvent and mixed with a plasticizer by any suitable method. Different plasticizer types and combinations may be used for different final articles such as sheets, slabs and powder. This is done partly for economic considerations and partly for particular properties desired in the finished material. The difficulty of obtaining sufficient plastification during block pressing and the low heat conductivity of the plastic ester of cellulose composition should be considered in selecting the plasticizer and the amount of residual low boiling solvent retained at the time of block pressing.

The plasticizer may be any suitable plasticizer selected for or compounded for the particular purpose to which the composition is to be used. For example, the plasticizer may be one or a mixture of any of the high boiling solvents or softening agents, e. g., the aryl sulphonamides such as para ethyl toluol sulphonamide, the alkyl phthalates such as dimethyl phthalate, the dialkyl tartrates such as dibutyl tartrate, the alkoxy esters of polybasic organic acids such as diethyoxy ethyl phthalate, the polybasic acid esters of the mono alkyl ethers of polyhydric alcohols such as diethylene glycol ethyl ether ester of phthalic acid, the alkyl esters of phosphoric acid such as triethyl glycol phosphate, the aryl esters of phosphoric acid such as tricresyl phosphate, the mixed alkyl and aryl phosphates and other like plasticizers. In connection with the plasticizers, modifying agents such as camphor may be employed to effect case hardening during block pressing. The plasticizers may be used alone or in combination with others. The quantity of plasticizers employed may vary within very great limits, say from 10 to 75 parts or more by weight per 100 parts of the cellulose ester, in the finished product.

The plastic composition may be formed to include besides the derivative of cellulose and plasticizer, effect materials such as pigments, filling materials, soluble or insoluble dyes or lakes, fire retardants, sizes and oily materials. Examples of pigments and filling materials are metallic salts and oxides such as titanium oxide, zinc oxide, mercurous chloride, bismuth oxy chloride, powdered metal such as powdered aluminum and bronze, powdered non-metallic substances such as logwood, lampblack, fish scale, clay, diatomaceous earths, etc. Examples of fire retardants are beta chlornaphthalene, triphenyl phosphate and tricresyl phosphate. Examples of sizes are the waxes, resins and synthetic resinous material. Examples of the oily materials are the animal, vegetable and mineral oils such as castor oil, olive oil, petroleum jelly, glycerines, glycols and the derivatives and substitution products of the polyhydric alcohols.

The derivative of cellulose, plasticizer and effect material may be mixed together in the presence of a solvent for the derivative of cellulose. Examples of solvents are acetone, mixtures of acetone and up to 20% or more of water, mixtures of acetone and up to 20% of methyl or ethyl alcohol, chloroform, ethylene dichloride, mixtures of ethyl alcohol and benzol, mixtures of ethylene dichloride and ethyl or methyl alcohol, mixtures of acetone alcohol and ethyl acetate and a mixture of methyl chloride and ethyl or methyl alcohol. These solvents may be employed alone or in mixture. Besides the low boiling solvents there may be employed solvents having boiling points between that of acetone and 135° C.

The mixture of the derivative of cellulose, plasticizer, solvent and effect material, if any, are mixed in a kneader or other suitable device as well known in the art. The material is then partly converted on malaxating rolls until the residual solvent is reduced to the desired extent then several sheets are stacked upon each other to form a block. The block may be of any suitable dimensions, say 12 to 24 inches wide and 12 to 60 inches long. The thickness, however, should be of a degree such that proper conversion treatment may later be applied. The thickness may vary from 1 to 12 inches depending upon the form of the conversion treatment employed.

These blocks may then be placed in a press provided with means for heating the same. One type of press consists of a support equipped with a steam jacket and side rails cooperating with a hydraulic piston having a steam heated head. By such a device the block is pressed between the support and the piston head while being confined to substantially its original dimensions by the side rails. The support and piston head may be heated to the same temperature or different temperatures and the side rails may or may not be heated.

The block of composite material may be placed in the pressure device and pressure applied in amounts of from 100 to 500 lbs. or more per square inch of stock. This pressure will cause an increase, without the application of heat, of the temperature at the center of the block, presumably due to internal friction. Heat may then be applied until there is a flow of material and welding of the sheets, which results in the conversion of the sheets into a homogeneous solid block. The temperature at which conversion takes place is dependent upon, besides other things referred to, the temperature at which the plasticizer becomes a solvent for the derivative of cellulose at the pressure employed.

Although the temperatures are known or easily ascertained at which a plasticizer or plasticizer mixture becomes a solvent and thereby becomes effective at conversion, this exact temperature, if employed in block pressing, may result in either brittle centers of unconversion or crumbly edges of over conversion. This is presumably due to the poor conductivity of the plastic composition which prevents, in normal periods of time, a proper heating of the interior of the block, while if sufficient time is employed the edges of the block are necessarily subjected to an over-dose of heat.

The temperature increase, in degrees centigrade, in the interior of a block, heated from the top and bottom, has a slope which approaches a straight line function, whereas the increase near top and bottom is progressive. The temperature in the interior of a block approaches that of the exterior provided the heating is carried out for a sufficient length of time, which however may be much longer than proper for the outside of the block. The temperature isotherm in the interior of the block, appears to be an ellipsoid, i. e., the distance from the side rails is of no consequence up to a depth of approximately 5 centimeters when a certain heat effect from the side rails becomes noticeable. The distance from top and/or bottom regulates the temperature at a given time and, for any given depth from top or bottom, the same temperature exists at all points more than a few centimeters in from the rails. Further, the temperature in the interior of the block increases after the heat is turned off during the set period and continues even after cold water is turned on for cooling the support and piston head. In view of these findings and for the purpose of this invention, the heat may be said to travel as a wave from the point of application to the center. The speed of travel of the wave of heat is partially dependent upon the amount of heat impressed on the block and the thickness of the block.

In view of the foregoing, to raise the temperature of an entire block to the conversion temperature for the particular plasticizer or plasticizer mixture employed, a high temperature heat wave of a temperature 10 to 50° C. above the required temperature of conversion is caused to travel toward the center of the block after which, and before any deleterious effect on the outer part of the block has taken place, the applied temperature is reduced to that of about the required conversion temperature. The block of thermoplastic composition is not injured at the outer surfaces by short exposure, say 10 minutes to 3 hours, to a temperature in excess of that normally required for conversion. Heating for longer periods of time, however, tends to over convert the outer portions of the block. By the method of the present invention a conversion temperature is forced into the center of the block and the whole block then held at the conversion temperature without the injurious lag in the temperature of the interior of the block accompanied by the less uniform products of either one part being overly converted by excessive length of treatment, or one part being under converted and raw due to fear of overly converting the other part.

In order to prevent a drop or a loss of the heat in the interior of the block, the change in applied temperature should be made gradually. For example, a period of 45 minutes may be employed in reducing the applied temperature, say from 250° F., which temperature produced the heat wave, to the conversion temperature, say 230° F., at which the block is maintained to thoroughly convert the composition.

The hydraulic or other pressure employed in block pressing should be kept constant in order to avoid flow and pressure marks and the chases should fit tightly to avoid spewing. Using maximum pressure through the whole heating period gives better welding and more rigid edges to the finished block.

The time of heat treatment will depend for the most part upon the thickness of the block being treated. Thus, a block of 6 centimeters thickness may be heated to 230° F. for 3 hours, set for 1 hour and cooled for 3 hours, while a block 10 centimeters thick may be heated for 7 hours, set for 2 hours and cooled for 7 hours, while a block 14 centimeters thick may be heated 16 hours, set for more than 2 hours and cooled for 16 hours. The temperature of conversion depends upon the plasticizer employed and may vary for the most generally used plasticizers, from 190° F. to 300° F.

After the heat treatment the conversion is continued by stopping the application of heat while still maintaining the pressure and allowing the block to set. After the block has set, the remaining heat is drawn out of the block by circulating cold water, brine, gas or other cooling medium in heat exchange relation to the surfaces of the blocks.

As illustration and not as a limitation the following example is given:

*Example*

A plastic composition containing 100 parts of cellulose acetate, 35 parts of dimethyl phthalate, 10 parts of triacetin, with or without 1 to 10 parts of para ethylene toluol sulphonamide, are mixed in the presence of acetone and kneaded on rolls till the desired consistency is obtained. Sheets of this material are stacked to a height of 6-7 centimeters and placed in a hydraulic press and a pressure of about 300 lbs. per square inch applied. The support and piston head are heated to 250° F. for 2½ hours and the temperature dropped during a period of 45 minutes to 230° F. at which temperature it is held for 3½ hours.

The heat is turned off and the block is allowed to set for 2½ hours after which cold water is circulated through the support and piston head to cool the block. The pressure is then removed and the block is found to be thoroughly welded, converted and possessed of uniform properties, as regards brittleness, throughout.

The block may then be sliced in any suitable manner into sheets suitable for laminated glass purposes or otherwise processed, moulded, cut, crushed or ground for forming the same into articles.

Using the above pressing rule or one derived by analogy in regard to temperatures according to plasticizer content and type, and time duration according to block thickness, it is possible to quickly bring the temperature of the interior of the block to conversion temperature. In the above example, the temperature of the interior of the block was raised to 90-100° C. and held there for approximately 4 hours, which temperature and time are sufficient for proper welding and conversion. Starting the heating with an increased temperature of 250° F. and gradually decreasing the temperature to 230° F. makes it possible to cut down the heating time to 6½ hours, and at the same time to attain a considerably higher temperature in the interior than is possible by lengthy heatings at the conversion temperature. The maximum temperature in the interior of the block was found to be 101° C.

This invention is applicable to the molding of shaped articles other than blocks and is applicable wherever heat and pressure are applied to the thermoplastic compound for the purpose of welding and converting same.

It is to be understood that the foregoing detailed description is merely given by way of illustration and many alterations may be made therein without departing from the spirit of our invention.

Having described our invention what we desire to secure by Letters Patent is:

1. In the method of preparing articles of thermoplastic compositions, containing derivatives of cellulose, wherein the composition is subjected to heat and pressure to convert same, the steps of applying a temperature higher than that required for conversion to raise the temperature of the interior of the mass and reducing the applied temperature to that required for conversion.

2. In the method of preparing articles of thermoplastic compositions, containing esters of cellulose, wherein the composition is subjected to heat and pressure to convert same, the steps of applying a temperature higher than that required for conversion to raise the temperature of the interior of the mass and reducing the applied temperature to that required for conversion.

3. In the method of preparing articles of thermoplastic compositions, containing cellulose acetate, wherein the composition is subjected to heat and pressure to convert same, the steps of applying a temperature higher than that required for conversion to raise the temperature of the interior of the mass and reducing the applied temperature to that required for conversion.

4. In the method of preparing articles of thermoplastic compositions, containing organic derivatives of cellulose, wherein the composition is subjected to heat and pressure to convert same, the steps of maintaining throughout the process a substantially constant pressure, applying a temperature higher than that required for conversion to cause a conversion temperature to pass to the interior of the mass and thereafter maintaining the temperature at that required for conversion.

5. In the method of preparing articles of thermoplastic compositions, containing cellulose acetate, wherein the composition is subjected to heat and pressure to convert same, the steps of maintaining throughout the process a substantially constant pressure, applying a temperature higher than that required for conversion to cause a conversion temperature to pass to the interior of the mass and thereafter maintaining the temperature at that required for conversion.

GEORGE SCHNEIDER.
BJORN ANDERSEN.